United States Patent
Jung et al.

(10) Patent No.: US 7,223,501 B2
(45) Date of Patent: *May 29, 2007

(54) POLYMER ELECTROLYTE AND LITHIUM BATTERY EMPLOYING THE SAME

(75) Inventors: Cheol-soo Jung, Cheonan (KR); Ki-ho Kim, Cheonan (KR); Eui-hwan Song, Cheonan (KR); Doo-kyung Yang, Daejeon Metropolitan (KR); Kyoung-hee Lee, Cheonan (KR); Yong-beom Lee, Seoul (KR); Hyun-jeong Lim, Incheon Metropolitan (KR); Takitaro Yamaguchi, Kanagawak-en (JP); Ryuichi Shimizu, Kanagawak-en (JP)

(73) Assignee: Samsung SDI Co., Ltd., Suwon-si (KR)

( * ) Notice: Subject to any disclaimer, the term of this patent is extended or adjusted under 35 U.S.C. 154(b) by 500 days.

This patent is subject to a terminal disclaimer.

(21) Appl. No.: 10/287,486

(22) Filed: Nov. 5, 2002

(65) Prior Publication Data

US 2003/0157411 A1    Aug. 21, 2003

(30) Foreign Application Priority Data

Feb. 16, 2002  (KR)  .................. 2002-8303

(51) Int. Cl.
*H01M 6/18*    (2006.01)
(52) U.S. Cl. ...................... 429/317; 429/307; 429/303; 429/326; 429/199
(58) Field of Classification Search ............... 429/317, 429/307, 316, 303, 326, 199
See application file for complete search history.

(56) References Cited

U.S. PATENT DOCUMENTS

2004/0076886 A1* 4/2004 Mori et al. ................. 429/306

FOREIGN PATENT DOCUMENTS

JP    2000-311516    11/2000

* cited by examiner

*Primary Examiner*—Laura Weiner
(74) *Attorney, Agent, or Firm*—Stein, McEwen & Bui, LLP

(57) ABSTRACT

A solid polymer electrolyte, a lithium battery employing the same, and methods of forming the electrolyte and the lithium battery. The polymer electrolyte includes polyester (meth) acrylate having a polyester polyol moiety having three or more hydroxide (—OH) groups, at least one hydroxde group being substituted by a (meth)acrylic ester group and at least one hydroxide group being substituted by a radical non-reactive group, or its polymer, a peroxide having 6 to 40 carbon atoms, and an electrolytic solution including a lithium salt and an organic solvent.

12 Claims, 3 Drawing Sheets

POLYMER ELECTROLYTE AND LITHIUM BATTERY EMPLOYING THE SAME

CROSS-REFERENCE TO RELATED APPLICATIONS

This application claims the benefit of Korean Application No. 02-8303, filed Feb. 16, 2002, in the Korean Intellectual Property Office, the disclosure of which is incorporated herein by reference.

BACKGROUND OF THE INVENTION

1. Field of the Invention

The present invention relates to a polymer electrolyte and a lithium battery employing the same, and more particularly, to a polymer electrolyte having good uniformity of an anode surface and an improved decomposition suppressing effect of an electrolytic solution at an anode surface by forming a lithium carbonate coating on the anode surface, and a lithium battery having good charging/discharging efficiency, an improved swelling suppressing effect and a good low-temperature characteristic by employing the polymer electrolyte.

2. Description of the Related Art

Lithium secondary batteries using liquid electrolytic solutions use an organic solvent having a low boiling point in order to enhance low-temperature performance. However, use of a low-boiling point organic solvent may give rise to swelling of an electrode assembly or case, if such a battery is allowed to stand at high temperature, resulting in deterioration of reliability and safety of a battery under a high temperature condition.

To overcome these problems, a method of using solid polymer electrolytes has been proposed. Using solid polymer electrolytes reduces danger of leakage of an electrolytic solution, thereby improving safety of a battery, unlike in the case of using liquid electrolytes.

However, using solid polymer electrolytic solutions decreases ionic conductivity compared to the case of using liquid electrolytes. Thus, in order to practically use solid polymer electrolytes in lithium secondary batteries, research must focus on solid polymer electrolytes having high ionic conductivity and good electrochemical stability.

Linear polymers or crosslinkable polymers of homopolymers or copolymers basically having ethylene oxide are mostly used as monomers of ionically conductive polymers for forming the solid polymer electrolytes.

However, the polymers formed from such monomers are susceptible to crystallization so that their characteristics at low temperature are poor. Also, since ethylene oxide has strong affinity to an electrolytic solution, the polymers may move with the electrolytic solution by interaction between the electrolytic solution and the polymer chains, deteriorating mobility of lithium ions.

SUMMARY OF THE INVENTION

To solve the above and other problems, it is an object of the present invention to provide a polymer electrolyte having high conductivity, good electrochemical stability, improved mobility of lithium ions, reduced gas generation during initial charge, a longer lifetime and a greater stability in swelling characteristics when a lithium battery is allowed to stand at higher temperature, and a manufacturing method thereof.

It is another object of the present invention to provide a lithium battery having an improved swelling suppressing effect over time, and, in particular, a high-rate discharging characteristic by using the polymer electrolyte.

To accomplish the above and other objects of the present invention, a polymer electrolyte according to an embodiment of the invention includes a polymer electrolyte including polyester (meth)acrylate having a polyester polyol moiety having three or more hydroxide (—OH) groups, at least one hydroxde group being substituted by a (meth)acrylic ester group and at least one hydroxide group being substituted by a radical non-reactive group, or its polymer; a peroxide having 6 to 40 carbon atoms; and an electrolytic solution including a lithium salt and an organic solvent.

According to an aspect of the invention, the radically non-reactive group includes an aliphatic hydrocarbon group having 1 to 20 carbon atoms, an aromatic hydrocarbon group having 5 to 20 carbon atoms, an ether group having 1 to 20 carbon atoms and an ester group having 1 to 20 carbon atoms. Preferably, the radical non-reactive group is represented by the general formula —OC(=O)R'$_n$, —OC(=O)R$_m$OR'$_n$, —O(C=O)R$_m$OC(=O)R'$_n$ (Here, m and n are indepedently integers in the range 1 to 20, R is (halogenated) alkylene group, (halogenated) arylene group, (halogenated) alkylarylene group or (halogenated) aralkylene group, and R' is a (halogenated) alkyl group, (halogenated) aryl group, (halogenated) alkylaryl group or (halogenated) aralkyl group.

The (meth)acrylic ester group substituted to the polyester polyol is preferably represented by the general formula —OC(=O)R$_n$OC(=O)CH=CH$_2$ or —OC(=O)R$_n$OC(=O)C(CH$_3$)=CH$_2$ or —OC(=O)R$_n$CH=CH$_2$ (n is an integer in the range of 1 to 20).

The molar ratio of the (meth)acrylic ester group to the radical non-reactive group is preferably 1:0.01 to 1:100.

In preparing the polymer, a peroxide having 6 to 40 carbon atoms is used as a polymerization initiator. Examples of the peroxide include at least one selected from the group consisting of isobutyl peroxide, lauroyl peroxide, benzoyl peroxide, m-toluoyl peroxide, t-butyl peroxy-2-ethylhexanoate, t-butylperoxybivalerate, t-butyloxyneodecanate, diisopropyl peroxy dicarbonate, diethoxy peroxy dicarbonate, bis(4-t-butylcyclohexyl) peroxydicarbonate, dimethoxy isopropyl peroxy dicarbonate, dicyclohexylperoxy dicarbonate and 3,3,5-trimethylhexanoyl peroxide, preferably lauroyl peroxide or benzoyl peroxide.

The content of the peroxide is preferably in the range of 0.3 to 5 parts by weight, based on 100 parts by weight of the polyester (meth)acrylate or its polymer.

The polyester polyol is preferably at least one selected from the group consisting of trialkylol selected from trimethylol, triethylol and tripropylol, glycerols, and erythritol selected from pentaerythritol and dipentaerythritol.

Preferably, a mixing ratio by weight of the polyester (meth)acrylate or its polymer to the electrolytic solution is about 1:2 to 1:35.

The lithium salt is preferably at least one selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlCl$_4$, LiN(C$_x$F$_{2x+1}$SO$_2$)(C$_y$F$_{2y+1}$SO$_2$) (x and y are independently a natural number), LiCl, and Li.

The organic solvent is preferably at least one selected from the group consisting of ethylene carbonate, diethyl carbonate, γ-butyrolactone, propylene carbonate, dimethyl carbonate, methylethyl carbonate, diethyl carbonate, vinylene carbonate, butylenes carbonate, benzonitrile, acetonitrile, tetrahydrofuran, 2-methylhydrofuran, dioxolane, 4-methyldioxolane, N,N-dimethylformamide, dimethylacetamide, dimethyl sulfoxide, 1,2-dimethoxy ethane, sulfolane, dichloroethane, chlorobenzene, nitrobenzene, methylpropyl carbonate, methylisopropyl carbonate, ethylbutyl carbonate, dipropyl carbonate, diisopropyl carbonate, dibutyl carbonate, diethylenegylcol, and dimethyl ether.

The polymer electrolyte may further include at least one florinated aromatic hydrocarbon compound. The fluorinated aromatic hydrocarbon compound includes 2-fluorotoluene, 3-fluorotoluene, 4-fluorotoluene, 2-fluorobenzene, 3-fluorobenzene and 4-fluorobenzene.

According to another embodiment of the present invention, a method of preparing the polymer electrolyte is provided including the operations of: (a-1) mixing polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, a peroxide having 6 to 40 carbon atoms, and an electrolytic solution including a lithium salt and an organic solvent, to form a solid polymer electrolyte composition; and (b-1) coating the composition on a support substrate and stripping a coating from the support substrate.

According to another aspect of the invention, heat treatment or UV radiation operations can be used after coating the composition on the support substrate.

According to still another embodiment, the present invention includes a lithium battery with a cathode, an anode, and the polymer electrolyte interposed between the cathode and the anode.

According to yet another embodiment of the present invention, a method of manufacturing a lithium battery is provided, including the operations of: (a-2) mixing polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, a peroxide having 6 to 40 carbon atoms, and an electrolytic solution including a lithium salt and an organic solvent, to form a solid polymer electrolyte composition; (b-2) obtaining a polymer electrolyte by coating the composition on a support substrate and stripping a coating from the support substrate, and (c-2) injecting the polymer electrolyte between the cathode and the anode to form an electrode assembly and putting the electrode assembly into a battery case.

According to another aspect of the invention, after coating the composition on the support substrate, the coating can be subjected to heat treatment or UV radiation. Here, the heat treatment can occur in operations (b-2) and (c-2), and at a temperature from about 25 to about 110° C.

According to a further embodiment of the present invention, a method of manufacturing a lithium battery includes the operations of: (a-3) mixing polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, a peroxide having 6 to 40 carbon atoms, and an electrolytic solution including a lithium salt and an organic solvent, to form a solid polymer electrolyte composition; (b-3) interposing a separator between the cathode and the anode to form an electrode assembly and putting the same into a battery case; and (c-3) injecting the polymer electrolyte composition into the resultant product of step (b-3).

According to another aspect of the invention, the operation (c-3) may further include subjecting the composition to heat treatment or UV radiation after injecting the composition. Here, the heat treatment is preferably performed at a temperature in a range at or between 25 and 110° C. Also, the lithium battery may further include a separator between the cathode and the anode. The separator is preferably a single-layered structure or a multi-layered structure of at least one selected from polyethylene and polypropylene.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE EMBODIMENTS

Figure 1:
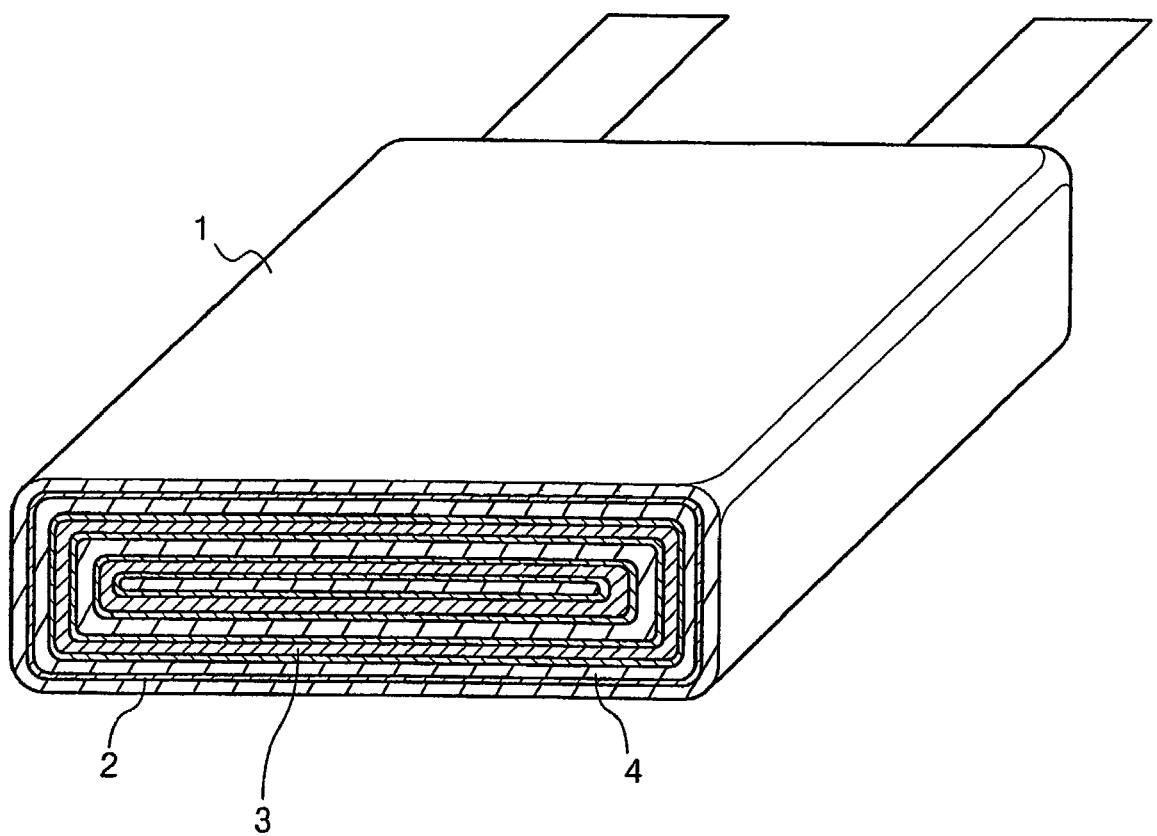
FIG. 1 shows a lithium battery according to an embodiment of the present invention.

Reference will now be made in detail to the embodiments of the present invention.

A polymer electrolyte according to the present invention includes (1) polyester (meth)acrylate having a polyester polyol moiety having three or more hydroxide (—OH) groups, at least one hydroxde group being substituted by a (meth)acrylic ester group and at least one hydroxide group being substituted by a radical non-reactive group, or its polymer, (2) an organic peroxide having 6 to 40 carbon atoms, and (3) an electrolytic solution including a lithium salt and an organic solvent.

The polyester (meth)acrylate of the present invention is obtained from polyester polyol having three or more hydroxide groups. If polyester (meth)acrylate modified from polyester polyol having not greater than two hydroxide groups is used as a monomer for forming a gel-type polymer electrolyte, a physically dense, viscous electrolyte is formed, lowering mobility of lithium ions, which adversely affect high-rate characteristic and lifetime characteristic of a battery. If a compound with all of the hydroxide groups of polyester polyol being substituted by (meth)acrylic ester is used as a monomer for forming a gel-type polymer electrolyte, gelation is impeded by steric hindrance so that unreacted (meth)acrylic acid or its derivative remains in a final polymer electrolyte. Here, the (meth) acrylic acid or its derivative is used to convert hydroxide groups of polyester polyol into (meth)acrylic ester. Since the unreacted (meth) acrylic acid or its derivative remaining in the polymer electrolyte is highly reactive, it may cause deterioration of low-temperature, high-rate discharging and lifetime characteristics of a lithium battery.

In the present invention, some hydroxide groups of polyester polyol having three or more hydroxide groups are substituted by (meth)acrylic esters and unsubstituted hydroxide groups are substituted by a radical non-reactive group to form a polyester (meth)acrylate or its polymer.

The polyester polyols having three or more hydroxide groups useful for preparing polyester (meth)acrylate of the invention can be synthesized by any methods and can also be any commercially available product. Examples of the polyester polyols having three or more hydroxide groups include, but are not limited to, trialkylols such as trimethylol, triethylol or tripropylol, glycerols, erythritols such as pentaerythritol or dipentaerythritol, and the like.

Some or all of the hydroxide groups of polyester polyol can be substituted by (meth)acrylic ester by general esterification. For example, polyester polyol and (meth)acrylic acid or its derivative (e.g., halogenated (meth)acrylic acid) (to be abbreviated as "MA") can be condensation-polymerized in the presence of a base catalyst or an acid catalyst.

In the above-noted methods, the content of MA is varied according to the mole number of hydroxy group of polyester polyol. According to an embodiment of the present invention, 0.1 to 10 moles MA is preferably used based on 1 mol hydroxy group of polyester polyol. More preferably, approximately 1 mol MA is used with respect to 1 mol hydroxy group of polyester polyol.

The performance of a polymer electrolyte can be desirably improved by adjusting terminal functional groups of compounds for forming the polymer electrolyte. The performance of a polymer electrolyte can be determined by a molar ratio of MA used when it reacts with polyester polyol to substitute a polyester polyol terminal by (meth)acrylic ester, to a compound (to be abbreviated as "RX") used when it reacts with polyester polyol to a polyester polyol terminal by a radical non-reactive group. The compound is exemplified by a carbonyl compound containing an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms, or a halogenated compound containing an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms.

The molar ratio of MA to RX is preferably in the range of 1:0.01 to 1:100, more preferably 1:0.5 to 1:3. If the RX content is less than the above range, all terminals of polyester polyol are undesirably substituted by (meth)acrylic ester groups. If the content of RX exceeds the above range, reacting (meth)acrylic ester groups are too small to form a desired polymer electrolyte.

Usable basic catalysts for use in esterification of polyester polyol according to the present invention include organic salts such as triethylamine, pyridine or dimethylaminepyridine, and inorganic salts such as lithium carbonate, potassium carbonate, lithium hydroxide or sodium hydroxide. Here, the basic catalyst is preferably used in an amount of 0.0001 to 0.01 parts by weight based on 1 part by weight of the overall reaction solvent. Usable examples of the acid catalyst used in esterification of polyester polyol according to the present invention include sulfuric acid, hydrochloric acid and phosphoric acid, and the amount used is the same as that of the basic catalyst.

The molecular structure of polyester polyol used in esterification can be modified by open-ring polymerization with a lactone compound. The modified structure of the polyester polyol polymerized with a lactone compound can adjust the length of alkyl group with hydroxy group functioning as a reacting group in the molecular backbone, thereby effectively changing physical properties of a polymer electrolyte.

Examples of the lactone compound include ε-caprolactone and γ-caprolactone, and can be used in any molar ratio with respect to the mole number of hydroxy groups of polyester polyol. However, in view of solubility and molecule size of lactone substituted polyester polyol, the lactone compound is preferably used in an amount of less than or equal to 10 mol, specifically 0.01 to 10 moles, based on 1 mol hydroxide group of polyester polyol.

Usable catalysts for promoting the open-ring polymerization include organic titan compounds, organic tin compounds and organic carboxylic acid metal salts of various metals. An example of the organic titan compounds is tetrapropyl titanate.

The catalyst is preferably in an amount of 0.001 to 0.5 parts by weight based on 1 part by weight of the lactone compound. If the content of the catalyst is not in the above range, the deviation undesirably gives rise to poor reactivity of open-ring polymerization.

The open-ring polymerization can be carried out in the absence or presence of an organic solvent. Usable organic solvents include aromatic compounds and saturated hydrocarbon compounds. The organic solvent is used in an amount of 1 to 50 parts by weight, preferably 2 to 10 parts by weight, based on 1 part by weight of polyester polyol.

The (meth)acrylic ester group substituted to the polyester polyol is particularly represented by the general formula —OC(=O)RnOC(=O)CH=CH2 or —OC(=O)RnOC(=O)C(CH3)=CH2 or —OC(=O)RnCH=CH2 (n is an integer in the range of 1 to 20).

Examples of the radical non reactive group include an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms, preferably the radical non-reactive group is represented by the general formula —OC(=O)R'n, —OC(=O)RmOR'n, —O(C=O)RmOC(=O)R'n(Here, m and n are independetly integers in the range 1 to 20, R is a (halogenated) alkylene group, (halogenated) arylene group, (halogenated) alkylarylene group or (halogenated) aralkylene group, and R' is (halogenated) alkyl group, (halogenated) aryl group, (halogenated) alkylaryl group or (halogenated) aralkyl group.

The molar ratio of the (meth)acrylic ester group to the group free of radical reactivity is preferably 1:0.01 to 1:100, more preferably 1:0.5 to 1:3.

The substituted polyester (meth)acrylic ester group or its polymer preferably has a weight-average molecular weight of about 300 to 100,000.

The organic peroxide having 6 to 40 carbon atoms serves to initiate polymerization of polyester (meth)acrylic ester or its polymers and is divided into a polar (hydrophilic) part of —C(=O)—O—O—C(=O) and a non-polar (hydrophobic) part of an aliphatic or aromatic hydrocarbon group having 6 to 40 carbon atoms. Such peroxides serve as a surfactant between an electrolytic solution and an anode, particularly a carbonaceous anode, thereby reducing resistance therebetween to suppress decomposition of the electrolytic solution at the anode surface.

Also, unlike the case of using an azobenzene initiator such as 2,2'-azoisobutyronitrile producing $N_2$, which is insoluble in an electrolytic solution, the peroxide having 6 to 40 carbon atoms of the present invention produces $CO_2$ gas, which is highly hydrophilic with respect to an electrolytic solution, thereby improving initial charging/discharging efficiency of a lithium battery.

Examples of the peroxide having 6 to 40 carbon atoms of the present invention include at least one selected from the group consisting of isobutyl peroxide, lauroyl peroxide, benzoyl peroxide, m-toluoyl peroxide, t-butyl peroxy-2-ethylhexanoate, t-butylperoxybivalerate, t-butyloxyneodecanate, diisopropyl peroxy dicarbonate, diethoxy peroxy dicarbonate, bis(4-t-butylcyclohexyl) peroxydicarbonate, dimethoxy isopropyl peroxy dicarbonate, dicyclohexylperoxy dicarbonate and 3,3,5-trimethylhexanoyl peroxide. The epoxide of the present invention is preferably lauroyl peroxide or benzoyl peroxide.

The initial charging/discharging efficiency of a lithium battery is closely related with formation of a coating formed on an electrode, particularly on an anode. The shape of the coating is directly associated with various performances of a battery. In a charged state after initial charging/discharging cycles, the observation of an anode surface reveals that the anode surface of a battery with a good initial charging/discharging efficiency is uniform and a large amount of lithium is precipitated on the anode surface of a battery with a poor initial charging/discharging efficiency.

In the case of using lauroyl peroxide as a polymerization initiator according to a preferred embodiment of the present invention, the reaction mechanism in which a lithium carbonate coating (Li2CO3) is formed on an anode surface is given below.

As shown in the reaction formula 1, lauroyl peroxide is decomposed to produce carbon dioxide gas, by which a lithium carbonate coating is formed on the anode surface. Formation of a lithium carbonate coating on the anode surface suppresses an electrolytic solution from being decomposed at the anode during initial charge. Thus, it is not necessary to perform a degassing step for removing the gas decomposing the electrolytic solution, the gas being generated after initial charge.

[Reaction Formula 1]

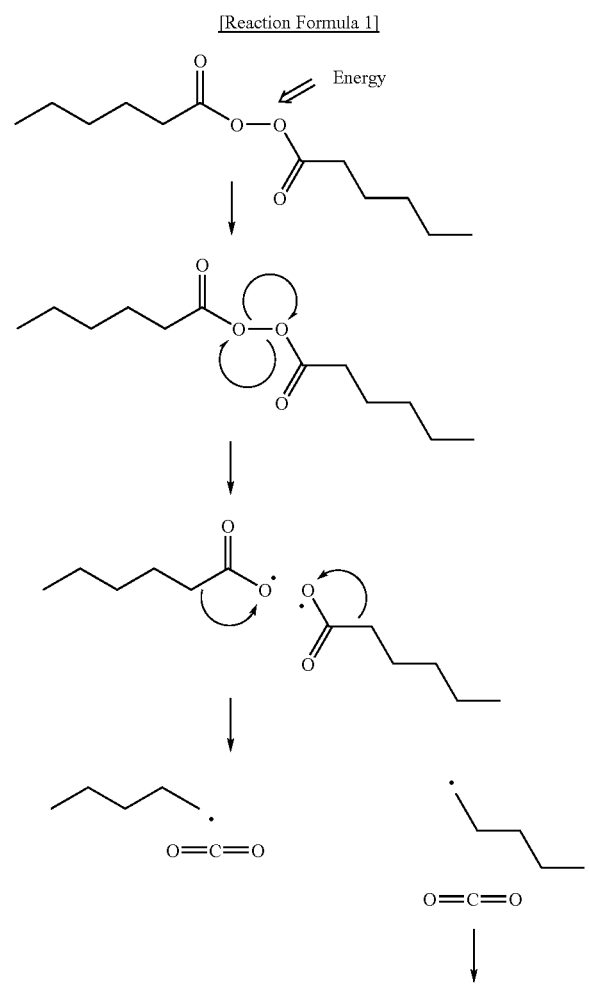

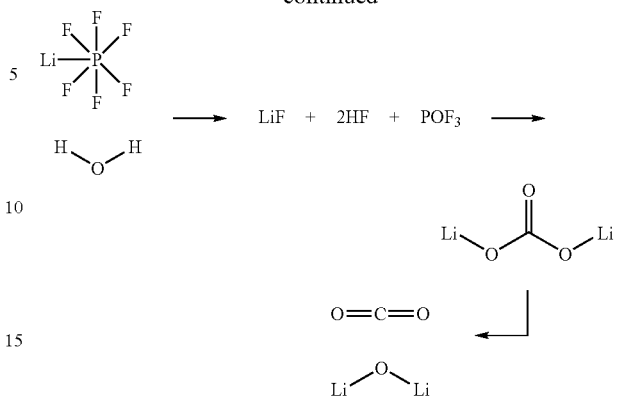

A method for preparing a polymer electrolyte according to the present invention will now be described.

A composition for forming a solid polymer electrolyte of the present invention is obtained from polyester (meth) acrylate having a polyester polyol moiety having three or more hydroxide (—OH) groups, at least one hydroxide group being substituted by a (meth)acrylic ester group and at least group one hydroxide group being substituted by a radical non-reactive group, an organic peroxide having 6 to 40 carbon atoms, and an electrolytic solution including a lithium salt and an organic solvent.

Subsequently, an electrode is impregnated or coated with the composition for a solid polymer electrolyte. In some cases, the resultant product is polymerized by heat treatment or UV radiation. The heat treatment temperature may vary depending on the polymerization initiator but is preferably in the range of 25 to 110° C., and more preferably 60 to 85° C. If the temperature for thermal polymerization is less than the above range, a large amount of unreacted monomers may remain or the reaction time is prolonged, resulting in an increase in the manufacturing cost. If the temperature for thermal polymerization exceeds the above range, vigorous decomposition of the lithium salt may result.

The obtained polymer electrolyte includes a polyester (meth)acrylic ester or its polymer, an electrolytic solution and a polymerization initiator.

In the composition for forming a polymer electrolyte, the organic peroxide having 6 to 40 carbon atoms as the polymerization initiator is preferably used in an amount of 0.3 to 5 parts by weight based on 100 parts by weight of polyester (meth)acrylic ester. If the content of the polymerization initiator is less than 0.3 parts by weight, polymerization reactivity becomes low. If the content of the polymerization initiator exceeds 5 parts by weight, the molecular weight of the polymer is not so high that the mechanical property of the polymer electrolyte deteriorates.

In the polymer electrolyte according to an aspect of the invention, the mixing ratio by weight of polyester (meth) acrylic ester to the electrolytic solution, is between 1:2 and 1:50. If the ratio exceeds the above range, the ionic conductivity of the polymer electrolyte deteriorates. If the ratio is less than the above range, gelation is not properly performed.

The electrolytic solution for forming the polymer electrolyte includes a lithium salt and an organic solvent. Here, examples of the organic solvent include a non-aqueous solvent selected from the group consisting of vinylene carbonate, propylene carbonate, ethylene carbonate, butylenes carbonate, benzonitrile, acetonitrile, tetrahydrofuran, 2-methyltetrahydrofuran, γ-butyrolactone, dioxolane, 4-methyldioxolane, N,N-dimethyl formamide, dimethylacetamide, dimethyl sulfoxide, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol or dimethyl ether, or a mixture of two or more of these solvents. In particular, it is preferred that the organic solvent essentially includes one of propylene carbonate, ethylene carbonate and butylenes carbonate, and one of dimethyl carbonate, methylethyl carbonate and diethyl carbonate. The concentration of the electrolytic solution including a lithium salt and an organic solvent is in the range of 0.6 to 1.5 M.

In the present invention, a florinated aromatic hydrocarbon compound may be further included as the organic solvent. In this case, the low-temperature characteristic can be advantageously improved. The florinated aromatic hydrocarbon compound is preferably added in an amount that the mixing ratio by weight of ethylene carbonate and the florinated aromatic hydrocarbon compound becomes 99:1 to 70:30. The florinated aromatic hydrocarbon compound is at least one selected from the group consisting of 2-fluorotoluene, 3-fluorotoluene, 4-fluorotoluene, 2-fluorobenzene, 3-fluorobenzene and 4-fluorobenzene. If the content of the florinated aromatic hydrocarbon compound exceeds the above range, the solubility of a lithium salt is lowered. If the content of the florinated aromatic hydrocarbon compound is less than the above range, the effect of improving low-temperature characteristics is undesirably poor.

The lithium salt of the present invention is at least one selected from the group consisting of LiPF6, LiBF4, LiSbF6, LiAsF6, LiClO4, LiCF3SO3, Li(CF3SO2)2N, LiC4F9SO3, LiAlO4, LiAlCl4, LiN(CxF2x+1SO2)(CyF2y+1SO2) (x and y are independently a natural number), LiCl, and LiI.

A method of manufacturing a lithium battery according to the present invention using the polymer electrolyte will now be described.

As shown in FIG. 1, a lithium battery according to an embodiment of the present invention includes a case 1 containing a cathode 3, an anode 4, and a polymer electrolyte 2 interposed between the cathode 3 and the anode 4. A separator (not shown) can be further disposed between the polymer electrolyte 2 and the cathode 3 or between the polymer electrolyte 2 and the anode 4.

The lithium battery according to the present invention can be manufactured by two methods below.

First, polyester (meth)acrylate having a polyester polyol moiety having three or more hydroxide (—OH) groups, at least one hydroxde group being substituted by a (meth) acrylic ester group and at least one hydroxide group being substituted by a radical non-reactive group, a peroxide having 6 to 40 carbon atoms, and an electrolytic solution including a lithium salt and an organic solvent, are mixed to obtain a composition for forming a polymer electrolyte.

The peroxide having 6 to 40 carbon atoms is used as a polymerization initiator. In particular, lauroyl peroxide or benzoyl peroxide is preferably used.

The composition for forming a polymer electrolyte is cast on a support substrate. Subsequently, the resultant is cured by heat or ultraviolet radiation to perform the polymerization reaction. Thereafter, the support substrate is subjected to stripping, thereby obtaining a film-like polymer electrolyte.

Separately, a cathode and an anode are fabricated in a method generally used for manufacture of a lithium battery. Here, a lithium composite oxide, a transition metal compound or a sulfur compound can be used as a cathode active material, and a lithium metal, carbonaceous material or graphite can be used as an anode active material.

Then, the polymer electrolyte is interposed between the cathode and the anode to form an electrode assembly to then be accommodated in a battery case, followed by sealing, thereby completing a lithium battery according to the present invention.

During the manufacture of a lithium battery, a separator made from an insulating resin having a network structure can be further provided between the cathode and the anode.

The separator has a single-layered structure or a multilayered structure of at least one selected from polyethylene and polypropylene/polyethylene. Examples of the separator include a single-layered polypropylene separator, a double-layered polyethylene/polypropylene separator, a three-layered polyethylene/polypropylene/polyethylene separator or a three-layered polypropylene/polyethylene/polypropylene separator.

Another method of preparing a lithium battery according to another embodiment of the present invention will be described. Like in the above-described preparation method, a composition used to form a polymer electrolyte is first prepared. Separately, a cathode and an anode are prepared, respectively, in the same manner as described above. Here, a lithium composite oxide, a transition metal compound or a sulfur compound can be used as a cathode active material, and a lithium metal, carbonaceous material or graphite can be used as an anode active material.

Then, a separator made from an insulating resin having a network structure is interposed between the cathode and the anode, followed by winding or stacking to form an electrode assembly to then be put into a battery case, thereby assembling a battery.

Thereafter, the composition for forming a polymer electrolyte is injected into the battery case accommodating the electrode assembly, followed by selective heat treatment or UV radiation to perform polymerization, thereby completing a lithium battery according to the present invention In the above-described preparation method, the heat treatment is performed at a temperature in the range of 25 to 110° C., preferably 60 to 85° C., to form a gel-type polymer electrolyte.

The thickness of the polymer electrolyte is preferably in the range of 5 to 90 μm. The polymer electrolyte has good ionic conductivity within this range of thickness.

The present invention can be applied to both lithium primary batteries and lithium secondary batteries.

The present invention will now be described through the following examples. However, the invention is understood not to be limited thereto.

EXAMPLE 1

To a mixture of 1 mol dipentaerythritol, 2 mol ε-caprolactone and a toluene solvent was added to 100 mg of a tetrapropyltitanate catalyst to be reacted at 50° C., thereby synthesizing a monomer of a dipentaerythritol derivative having some terminal hydroxy groups substituted by pentylalcohol.

Then, 1 mol of the pentaerythritol derivative, 4 mol of acrylic acid and 2 mol of butylcarboxylic acid were reacted to obtain a polyester hexaacrylate compound having two hydroxy groups present at the terminals of the pentaerythritol derivative substituted by —OC(=O)(CH2)5OC(=O)CH=CH2 and the remaining four hydroxy groups substituted by —OC(=O)(CH2)3CH3.

To 30 g of a mixed solvent of ethylene carbonate (EC) and diethyl carbonate (DEC) in the mixing ratio by weight of 3:7, in which 1.3 mol/L of LiPF6 was dissolved, were added 1 g of the polyester hexaacrylate compound and 10 mg of lauroyl peroxide to obtain a composition for a polymer electrolyte.

50 g of N-methylpyrrolidone (NMP), 3 g of polyvinylidenefluoride (PVDF), 94 g of C-10 (Nippon Chemical Co.) and 3 g of super-P conductive carbon were mixed to prepare a slurry. Then, an aluminum (Al) foil was coated with the slurry to a thickness of 150 µm to prepare a cathode. 90 g of mezocarbon fiber (MCF, available from PETCOA, LTD.) and 10 g of PVDF were mixed to produce a slurry. Then, a copper (Cu) foil was coated with the slurry to a thickness of 170 µm to prepare an anode.

A separator was interposed between the cathode and the anode and wound to be put into a battery case. Next, the composition for forming a polymer electrolyte was injected into the battery case in an appropriate amount, followed by heating at approximately 70° C. for 2 hours to perform thermal polymerization, thereby completing a lithium secondary battery.

EXAMPLE 2

A lithium secondary battery was manufactured in the same manner as in Example 1, except for using benzoyl peroxide instead of lauroyl peroxide in preparing a polymer electrolyte.

EXAMPLE 3

A lithium secondary battery was manufactured in the same manner as in Example 1, except for heating at approximately 70° C. for 2 hours being omitted in preparing a polymer electrolyte.

Comparative Example 1

A lithium secondary battery was manufactured in the same manner as in Example 1, except for using 2,2'-azobisisobutylnitrile (AIBN) instead of lauryl peroxide in preparing a polymer electrolyte.

Comparative Example 2

A lithium secondary battery was manufactured in the same manner as in Example 1, except for using polyethyleneglycol diacrylate instead of the polyester hexaacrylate compound in preparing a composition for forming a polymer electrolyte.

Comparative Example 3

3 g of PVDF, 94 g of C-10 (available from Nippon Chemical Co.) and 3 g of Super P conductive carbon were dissolved in 50 g of NMP to produce a slurry. Then, an aluminum (Al) foil was coated with the slurry to a thickness of 150 µm to prepare a cathode. 90 g of mezocarbon fiber (MCF, available from PETCOA, LTD.) and 10 g of PVDF were mixed to produce a slurry. Then, a copper (Cu) foil was coated with the slurry to a thickness of 170 µm to prepare an anode.

A separator was interposed between the cathode and the anode and wound to be put into a battery case. Next, an electrolytic solution having a mixed solvent of EC and DEC in the mixing ratio by weight of 3:7, in which 1.3 mol/L of LiPF6 was dissolved, was injected into the battery case, thereby completing a lithium secondary battery.

The initial charging/discharging efficiency, rate-dependent charge/discharge characteristics, low-temperature characteristics and lifetime characteristics of the lithium secondary batteries manufactured in Examples 1–3 and Comparative Examples 1–3 were evaluated, and the evaluation results thereof are shown in Table 1. Here, the evaluation was carried out under the following conditions.

First, the condition of measuring the (0.2 C discharge/0.2 C charge) capacity ratio of each battery corresponds to the condition for the first charging/discharging cycle after production of the battery, by which a decomposition tendency of an electrolytic solution and other impurities in the battery, and a change in irreversible capacity due to the decomposition during initial charge can be identified. The charge to discharge capacity ratio was found when the conditions for the cycle test were made as follows: charging was performed at 0.2 C and 4.2 V cut-off, rest time of 30 minutes was allowed at room temperature, and then discharging was performed at 0.2 C and 2.75 V cut-off.

The condition of measuring the (0.2 C discharge/0.5 C charge) capacity ratio of each battery corresponds to the condition for the second charging/discharging cycle after production of the battery, by which a change in capacity ratio of the battery relative to the standard charge/discharge capacity can be identified. The charge to discharge capacity ratio was found when the conditions for the cycle test were made as follows: charging was performed at 0.5 C and 4.2 V cut-off, rest time of 30 minutes was allowed at room temperature, and then discharging was performed at 0.2 C and 2.75 V cut-off.

The condition of measuring the (2.0 C discharge/0.2 C discharge) capacity ratio of each battery corresponds to the condition for the third charging/discharging cycle after production of the battery, by which a change in capacity ratio of the battery relative to a high-rate discharge capacity can be identified. The charge to discharge capacity ratio was found when the conditions for the cycle test were made as follows: charging was performed at 0.5 C and 4.2 V cut-off, rest time of 30 minutes was allowed at room temperature, and then discharging was performed at 0.2 C and 2.75 V cut-off and at 2.0 C and 2.75 V cut-off, respectively.

The condition of measuring the (low/high temperature) 0.2 C discharge capacity ratio of each battery corresponds to the condition for the fourth charging/discharging cycle after production of the battery, by which a change in capacity of the battery relative to the low-temperature discharge capacity can be identified. The charge to discharge capacity ratio was found when the conditions for the cycle test were made as follows: charging was performed at 0.5 C and 4.2 V cut-off, rest time of 30 minutes was allowed at room temperature, discharging was performed at 0.2 C and 2.75 V cut-off at room temperature and at 0.2 C and 2.75 V cut-off at −20° C., respectively.

The condition of measuring the (1/100 cycle) 0.2 C discharge capacity ratio of each battery corresponds to the condition for cycles following the 5th charging/discharging cycle after production of the battery, by which a change in lifetime characteristic of the battery can be identified. The discharge capacity ratio was found when the conditions for the continuous 100 cycle test were made as follows: charging was performed at 1.0 C and 4.2 V cut-off, rest time of 30 minutes was allowed at room temperature, discharging was performed at 1.0 C and 2.75 V cut-off at room temperature.

TABLE 1

|  | Example 1 | Example 2 | Example 3 | Comparative Example 1 | Comparative Example 2 | Comparative Example 3 |
|---|---|---|---|---|---|---|
| (0.2 C discharge/0.2 C charge) capacity ratio | 0.93 | 0.93 | 0.89 | 0.85 | 0.93 | 0.90 |
| (0.2 discharge/0.5 C charge) capacity ratio | 1.00 | 1.00 | 1.00 | 1.00 | 1.00 | 0.93 |
| (2.0 discharge/0.2 C discharge) capacity ratio | 0.98 | 0.98 | 0.98 | 0.95 | 0.98 | 0.90 |
| 0.2 C discharge capacity ratio at low and high temperatures | 0.85 | 0.84 | 0.85 | 0.90 | 0.84 | 0.75 |
| (1/100 cycle) discharge capacity ratio | 0.97 | 0.97 | 0.95 | 0.84 | 0.85 | 0.72 |

As shown in Table 1, the lithium secondary battery prepared using AIBN as a polymerization initiator in preparing a polymer electrolyte according to Comparative Example 1 has improved rate-dependent discharging characteristic and low-temperature discharging characteristic as compared to the lithium secondary batteries prepared using peroxides in preparing the polymer electrolytes according to Examples 1 and 2. However, the other characteristics of the conventional lithium secondary battery, such as initial charging/discharging efficiency and lifetime characteristics, were inferior to those of the present invention batteries. Also, the lifetime characteristic and low-temperature discharging characteristic of the battery according to Comparative Example 2 were inferior to those according to Examples 1–3. This is presumably because the polyester hexaacrylate compound as a monomer for a polymer electrolyte having at least three acrylate functional groups as proposed in Examples 1–3 has smaller resistance to mobility of lithium ions occurring while the lithium ions are intercalated/deintercalated to/from an electrode surface, leading to uniformity in electrode surface even after prolonged life cycles. In the case of the battery according to Comparative Example 3 in which a liquid electrolyte was used, various battery performances were poor due to the gas generated during initial charge.

In view of the overall performance, although the battery system according to Example 3 is not superior to a polymerized battery system with heat treatment (Examples 1–2), it is better than a battery system in which a polymerizable monomer and a polymerization initiator proposed in the present invention are not used (Comparative Examples 1–3). This suggests that the battery performance can be improved just by adding the polymerizable monomer or polymerization initiator proposed in the present invention.

High-temperature storage characteristics of the lithium secondary batteries according to Examples 1–3 and Comparative Examples 1–3 were investigated and the results thereof are shown in Table 2. The high-temperature storage characteristics were evaluated as changes in thickness and open circuit voltage (OCV) before and after each battery was stored at 90° C. for approximately 4 hours.

TABLE 2

|  | Change in thickness (mm) | | Change in OCV (V) | |
|---|---|---|---|---|
|  | Before storage at high temperature | After storage at high temperature | Before storage at high temperature | After storage at high temperature |
| Example 1 | 3.62 | 3.66 | 4.18 | 4.15 |
| Example 2 | 3.62 | 3.69 | 4.18 | 4.15 |
| Example 3 | 3.62 | 3.89 | 4.18 | 4.16 |
| Comparative Example 1 | 3.62 | 3.88 | 4.18 | 4.14 |
| Comparative Example 2 | 3.62 | 3.65 | 4.18 | 4.15 |
| Comparative Example 3 | 3.62 | 4.51 | 4.18 | 4.16 |

As shown in Table 2, in the cases of using lauroyl peroxide or benzoyl peroxide as a polymerization initiator (Examples 1–3), little swelling occurred at high temperature and a big change in voltage was not observed.

In Comparative Example 1 in which AIBN was used as a polymerization initiator, swelling at high temperature was suppressed to an extent, but the swelling suppressing effect was lower than the cases of Examples 1–3.

Figure 2:
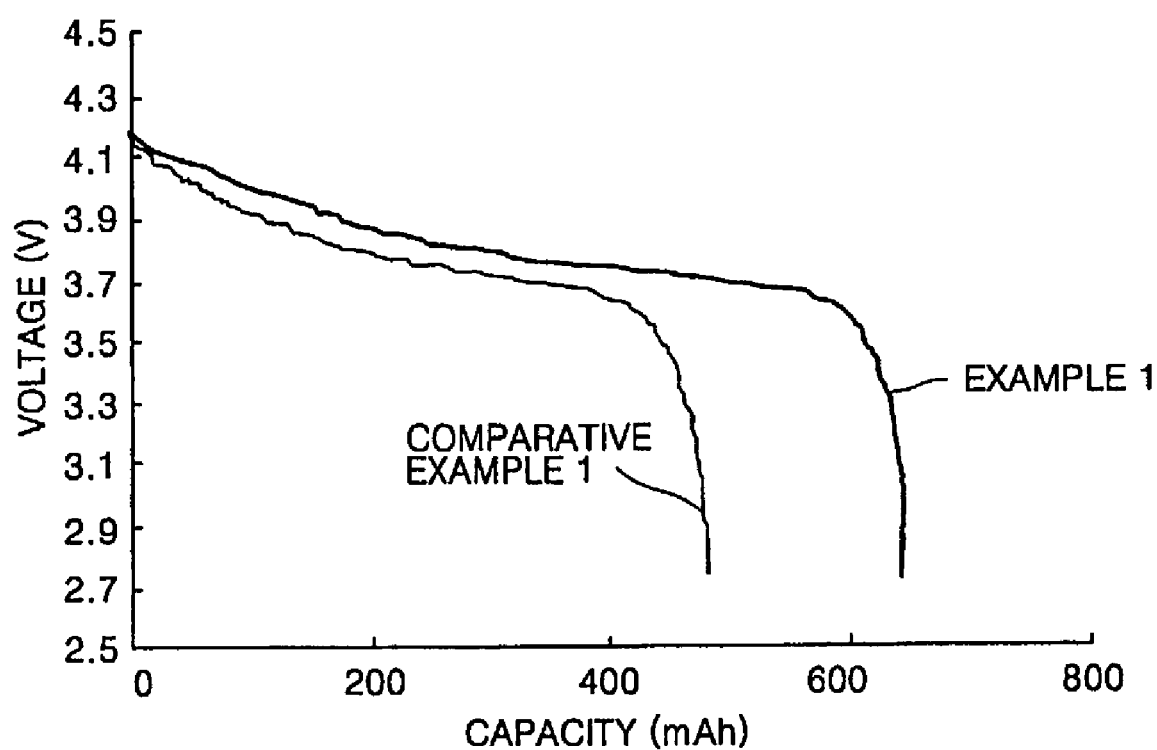
FIG. 2 is a graph showing initial charge and discharge capacity in lithium secondary batteries according to Example 1 of the present invention and Comparative Example 1.

FIG. 2 is a graph showing initial charge and discharge capacity in lithium secondary batteries according to Example 1 of the present invention and Comparative Example 1. Referring to FIG. 2, the lithium secondary battery according to Example 1 has better initial charging/discharging efficiency than that according to Comparative Example 1.

Next, anode surface states of the lithium secondary batteries according to Example 1 and Comparative Example 1 were evaluated in a charged state after initial charge and discharge cycles, and the results thereof showed that the anode surface of the lithium secondary battery according to Example 1 with a good initial charging/discharging efficiency was uniform while a large amount of lithium was precipitated at various locations on the anode surface of the lithium secondary battery according to Comparative Example 1 with a poor initial charging/discharging efficiency. From these results, it can be seen that the initial charging/discharging efficiency is closely related to formation of an anode surface coating.

Figure 3:
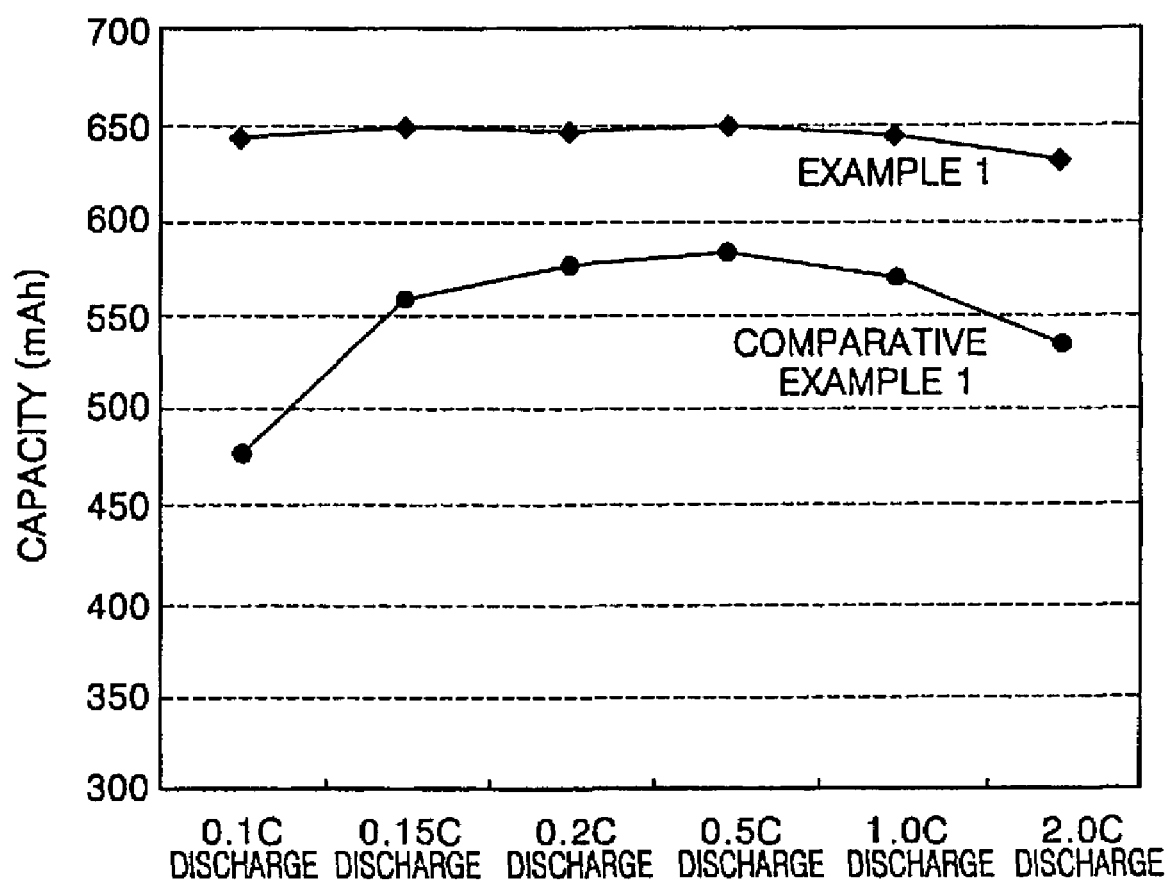
FIG. 3 shows changes in rate dependent discharge capacity in lithium secondary batteries according to Example 1 of the present invention and Comparative Example 1.

FIG. 3 shows changes in rate dependent discharge capacity in lithium secondary batteries according to Example 1 of the present invention and Comparative Example 1.

Referring to FIG. 3, the lithium secondary battery according to Example 1 has good discharge characteristic and improved high-temperature storage characteristic compared to the case of Comparative Example 1.

According to the present invention, a lithium carbonate coating is formed on an anode surface due to carbon dioxide gas produced by decomposition of a polymerization initiator for forming a polymer electrolyte, that is, peroxide having 6 to 40 carbon atoms, so that the anode surface has good uniformity. As described above, decomposition of an electrolytic solution can be suppressed by forming a lithium carbonate coating on the anode surface, which improves ionic conductivity of lithium, thereby obtaining a lithium battery having good charging/discharging characteristics, an improved swelling suppressing effect and a low-temperature characteristic.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A polymer electrolyte comprising:
   polyester (meth)acrylate having a polyester polyol moiety, the polyester polyol moiety having three or more hydroxide (—OH) groups, at least one hydroxide group being substituted by a (meth)acrylic ester group and at least one hydroxide group being substituted by a radical non-reactive group, or its polymer;
   a peroxide having 6 to 40 carbon atoms; and
   an electrolytic solution including a lithium salt and an organic solvent.

2. The polymer electrolyte according to claim 1, wherein the radical non-reactive group is selected from the group consisting of an aliphatic hydrocarbon group having 1 to 20 carbon atoms, an aromatic hydrocarbon group having 5 to 20 carbon atoms, an ether group having 1 to 20 carbon atoms and an ester group having 1 to 20 carbon atoms.

3. The polymer electrolyte according to claim 1, wherein the (meth)acrylic ester group is represented by the general formula —OC(=O)(CH$_2$)$_n$OC(=O)CH=CH$_2$ or —OC(=O)(CH$_2$)$_n$OC(=O)C(CH$_3$)=CH$_2$,
   wherein n is an integer in the range of 1 to 20.

4. The polymer electrolyte according to claim 1, wherein the radical non-reactive group is represented by the general formula —OC(=O)R'$_n$, —OC(=O)R$_m$OR'$_n$, —O(C=O)R$_m$OC(=O)R'$_n$,
   wherein m and n are independently integers in the range 1 to 20, R is an alkylene group, a halogenated alkylene group, an arylene group, a halogenated arylene group, an alkylarylene group, a halogenated alkylarylene group, an aralkylene group, or a halogenated aralkylene group, and R' is an alkyl group, a halogenated alkyl group, an aryl group, a halogenated aryl group, an alkylaryl group, a halogenated alkylaryl group, an aralkyl group or a halogenated aralkyl group.

5. The polymer electrolyte according to claim 1, wherein the molar ratio of the (meth)acrylic ester group to the radical non-reactive group is 1:0.01 to 1:100.

6. The polymer electrolyte according to claim 1, wherein the peroxide is at least one selected from the group consisting of isobutyl peroxide, lauroyl peroxide, benzoyl peroxide, m-toluoyl peroxide, t-butyl peroxy-2-ethylhexanoate, t-butylperoxybivalerate, t-butyloxyneodecanate, diisopropyl peroxy dicarbonate, diethoxy peroxy dicarbonate, bis(4-t-butylcyclohexyl) peroxydicarbonate, dimethoxy isopropyl peroxy dicarbonate, dicyclohexylperoxy dicarbonate and 3,3,5-trimethylhexanoyl peroxide.

7. The polymer electrolyte according to claim 1, wherein the content of the peroxide is about 0.3 to 5 parts by weight, based on 100 parts by weight of the polyester (meth)acrylate or its polymer.

8. The polymer electrolyte according to claim 1, wherein the polyester polyol is at least one selected from the group consisting of trialkylol selected from trimethylol, triethylol and tripropylol, glycerols, and erythritol selected from pentaerythritol and dipentaerythritol.

9. The polymer electrolyte according to claim 1, wherein a mixing ratio by weight of the polyester (meth)acrylate or its polymer to the electrolytic solution is about 1:2 to 1:50.

10. The polymer electrolyte according to claim 1, wherein:
    the lithium salt is at least one selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_4$, LiAlCl$_4$, LiN(C$_x$F$_{2x+1}$SO$_2$)(C$_y$F$_{2y+1}$SO$_2$) (x and y are independently a natural number), LiCl, and LiI.

11. The polymer electrolyte according to claim 1, wherein the organic solvent is at least one selected from the group consisting of ethylene carbonate, diethyl carbonate, γ-butyrolactone, propylene carbonate, dimethyl carbonate, methylethyl carbonate, diethyl carbonate, vinylene carbonate, butylene carbonate, benzonitrile, acetonitrile, tetrahydrofuran, 2-methylhydrofuran, dioxolane, 4-methyldioxolane, N,N-dimethylformamide, dimethylacetamide, dimethyl sulfoxide, 1,2-dimethoxy ethane, sulfolane, dichloroethane, chlorobenzene, nitrobenzene, methylpropyl carbonate, methylisopropyl carbonate, ethylbutyl carbonate, dipropyl carbonate, diisopropyl carbonate, dibutyl carbonate, diethylenegylcol, and dimethyl ether.

12. The polymer electrolyte according to claim 1, wherein the organic solvent is a fluorinated aromatic hydrocarbon selected from the group consisting of 2-fluorotoluene, 3-fluorotoluene, 4-fluorotoluene, 2-fluorobenzene, 3-fluorobenzene, 4-fluorobenzene and a mixture including at least two of the fluorinated aromatic hydrocarbons selected from the group consisting of 2-fluorotoluene, 3-fluorotoluene, 4-fluorotoluene, 2-fluorobenzene, 3-fluorobenzene, 4-fluorobenzene.

* * * * *

UNITED STATES PATENT AND TRADEMARK OFFICE
CERTIFICATE OF CORRECTION

PATENT NO. : 7,223,501 B2  
APPLICATION NO. : 10/287486  
DATED : May 29, 2007  
INVENTOR(S) : Cheol-soo Jung et al.

Page 1 of 1

It is certified that error appears in the above-identified patent and that said Letters Patent is hereby corrected as shown below:

On the Title Page, Item (57)  
Abstract, line 5  
change "hydroxde" to --hydroxide--

Signed and Sealed this

Fourteenth Day of August, 2007

JON W. DUDAS  
*Director of the United States Patent and Trademark Office*

UNITED STATES PATENT AND TRADEMARK OFFICE
CERTIFICATE OF CORRECTION

PATENT NO. : 7,223,501 B2  Page 1 of 1
APPLICATION NO. : 10/287486
DATED : May 29, 2007
INVENTOR(S) : Cheol-soo Jung et al.

It is certified that error appears in the above-identified patent and that said Letters Patent is hereby corrected as shown below:

On the Title Page, Item (57)
Abstract, line 5
change "hydroxde" to --hydroxide--

Signed and Sealed this

Fourth Day of September, 2007

JON W. DUDAS
*Director of the United States Patent and Trademark Office*